B. J. HASTINGS.
SUBMARINE SALVAGE APPARATUS.
APPLICATION FILED APR. 13, 1916.

1,191,509.

Patented July 18, 1916.
2 SHEETS—SHEET 1.

INVENTOR:
Benjamin J. Hastings
by Macleod, Calver, Copeland & Dike
Attys.

B. J. HASTINGS.
SUBMARINE SALVAGE APPARATUS.
APPLICATION FILED APR. 13, 1916.

1,191,509.

Patented July 18, 1916.
2 SHEETS—SHEET 2.

INVENTOR:
Benjamin J. Hastings
by Macleod, Calver, Copeland & Dike
Attys.

UNITED STATES PATENT OFFICE.

BENJAMIN J. HASTINGS, OF TAUNTON, MASSACHUSETTS.

SUBMARINE-SALVAGE APPARATUS.

1,191,509.        Specification of Letters Patent.        Patented July 18, 1916.

Application filed April 13, 1916. Serial No. 90,820.

*To all whom it may concern:*

Be it known that I, BENJAMIN J. HASTINGS, a citizen of the United States, residing at Taunton, Bristol county, State of Massachusetts, have invented a certain new and useful Improvement in Submarine-Salvage Apparatus, of which the following is a specification, reference being had therein to the accompanying drawings.

The invention relates to an apparatus for raising sunken vessels, more particularly submarines where the submarine has become disabled while it is submerged and is unable to come to the surface, and also for the raising of a safe or other receptacle for valuables on the submerged vessel.

It is necessary that the submerged vessel should not only be definitly located, but that there shall be some sort of a line connection between the sunken vessel and the rescuing vessel, and to accomplish this the sunken vessel is provided with a line attached thereto and having a float connected therewith which when the float is released from the sunken vessel will rise to the surface carrying with it the end of the line to which the float is attached, and when the float reaches the surface it will indicate to the rescuing party the location of the sunken vessel. This float may be a simple float without any particular signaling apparatus, or it may be provided with an illuminating apparatus which may be electrically operated by those imprisoned in the sunken vessel, or it may be some kind of sound signal electrically operated from within the vessel or by the movement of the wind or waves at the surface.

The apparatus embodying my invention requires certain special equipment on the sunken vessel and certain coöperating apparatus on the rescuing vessel.

The invention will be fully understood from the following description when taken in connection with the accompanying drawings, and the novel features will be pointed out and clearly defined in the claims at the close of this specification.

Figure 1:
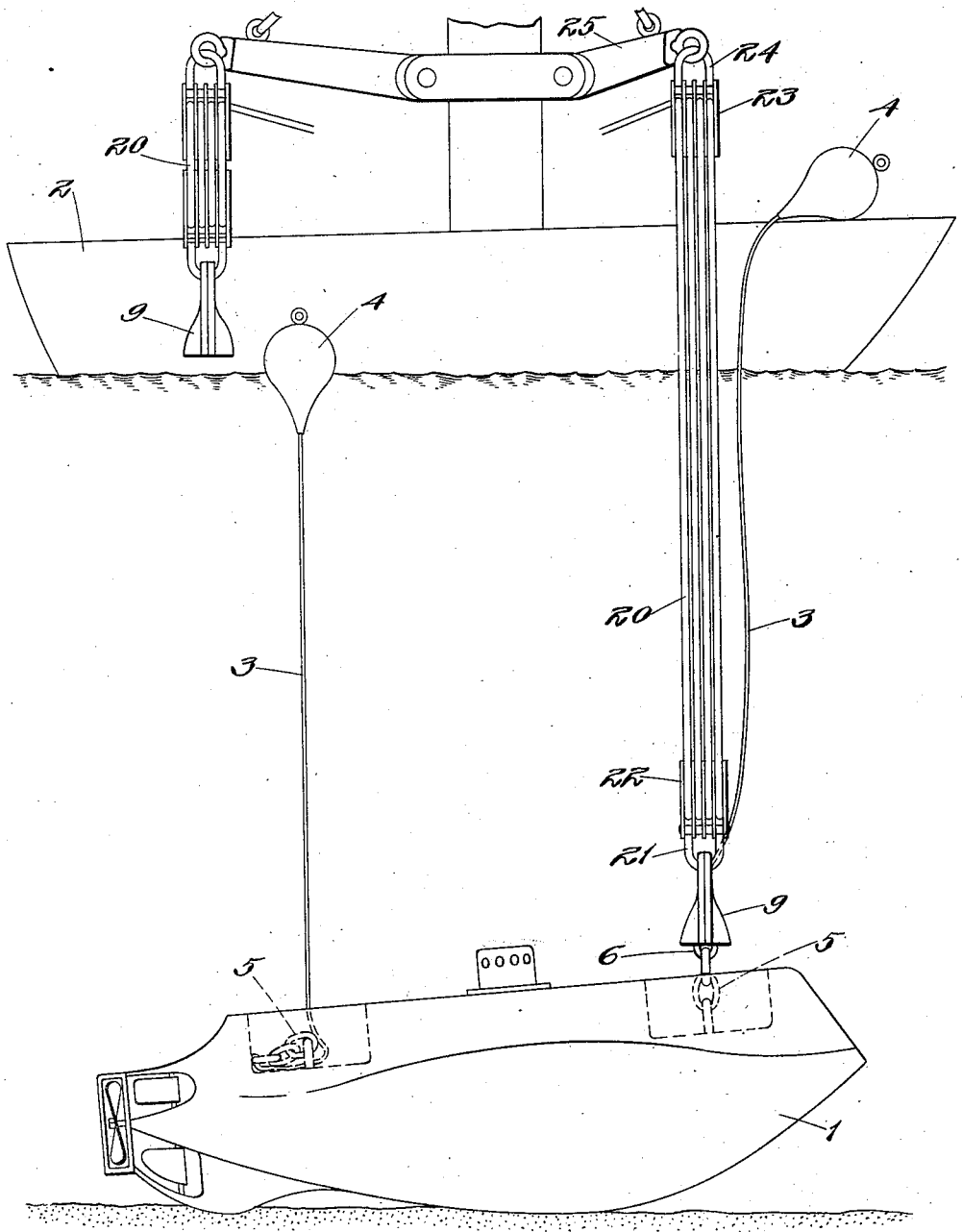
Figure 2:
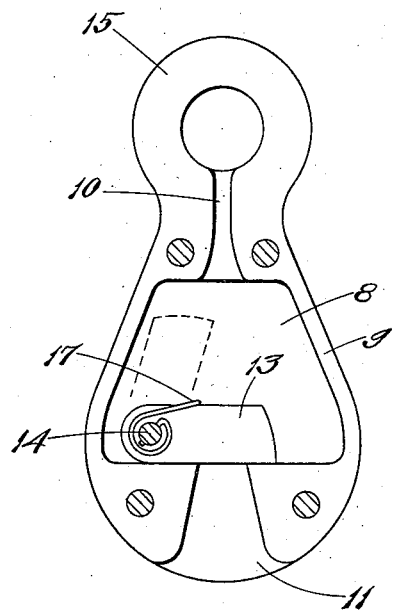
Figure 4:
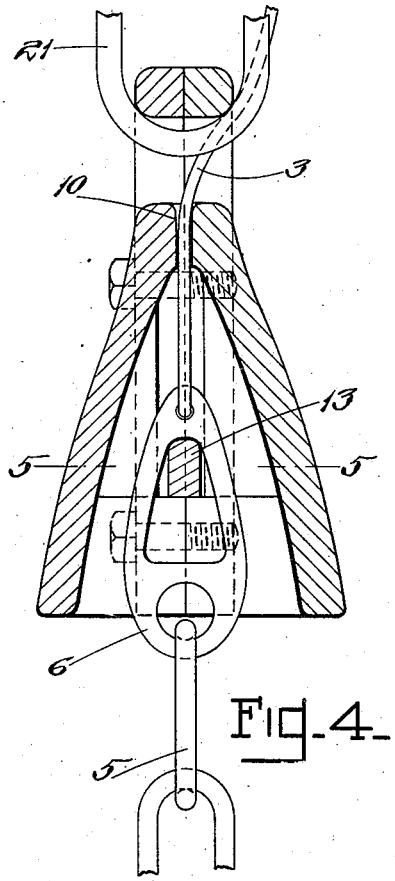
Figure 3:
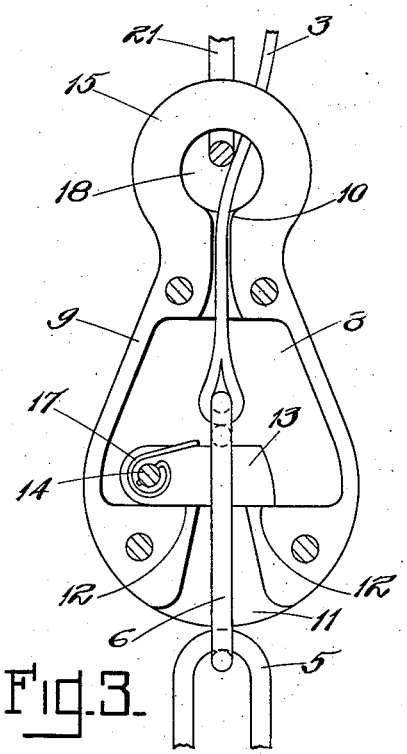
Figure 5:
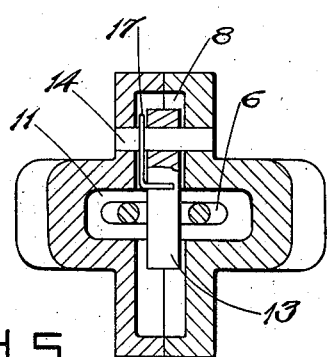

In the drawings, Figure 1 is a side elevation representing, somewhat diagrammatically, a sunken vessel, a rescuing vessel at the surface, and the salvage apparatus connected with both vessels for the purpose of raising the sunken vessel. Fig. 2 is a vertical section of the salvage hook or coupling device, detached. Fig. 3 is a vertical sectional view showing the salvage hook or coupling device after it has moved down the guide cord and has been connected with the cable or chain attached to the sunken vessel. Fig. 4 is a vertical sectional view taken at right angles to Fig. 3. Fig. 5 is a horizontal section on line 5, 5 of Fig. 4.

Referring now to the drawings, 1 represents the sunken vessel and 2 the rescuing vessel.

3 represents a cord attached at one end to the submerged vessel and carrying at the other end a float 4, said cord being usually carried coiled up on the submarine and being of sufficient length so that when the float is released it will carry the float to the surface of the water. Preferably the vessel is equipped with at least two sets of apparatus and as shown in the drawings there are two of said floats and two sets of salvage apparatus. A description of one covers the description for both. A comparatively short but very strong chain 5 is at all times connected with the top of the submarine. The other end of said chain terminates in a link 6 of a peculiar shape as shown in Fig. 4, being somewhat triangular or pear shaped in front elevation with its narrow end secured to the lower end of the cord 3, so that by pulling upward on said cord after the float has carried the outer end of the cord 3 to the surface, the narrow end of said link will stand uppermost.

The salvage hook or coupling member has a shell 9 formed with an aperture 10 which extends down through the head into the interior chamber 8 of the shell, and a downwardly flaring passage 11 extends from said chamber through the bottom of the shell. Said passage 11 is of elongated form in transverse section as shown in Fig. 5 for the purpose of guiding the connecting link 6 as will be hereinafter described. A bar 13 is pivoted at one end at 14 within the shell and normally extends crosswise of the upper end of the passage 11, resting upon the shoulders 12, 12 on opposite sides of the opening 11. These shoulders are preferably formed by the thicker wall of the bottom of the shell.

The top of the shell is provided with a ring 15 and secured thereto is the cable 20 by which the said shell may be raised or lowered. This cable 20 should be of sufficient strength to lift the weight of the submerged vessel or other object that is to be raised. Preferably a spring 17 is coiled around the shaft 14 on which the said bar 13 is pivoted, one end of said spring being secured to said shaft and the other end bearing upon the upper side of the bar 13 in such manner as to aid in retaining the said bar on its seat. Said spring will be put under greater tension when the free end of the bar is lifted and the bar is turned up on its pivot, and tends to throw back the said bar on to its seat when the upward pressure on the said bar is released. The aperture 11 is elongated in cross section as shown in Fig. 5, being narrow in one direction, preferably being only of about sufficient width to easily receive the link 6 when the plane of the link is in alinement with the plane of the aperture, so that the link can enter the said aperture only when the link is turned in a certain way.

The operation of the device is as follows: When the occupants of the submarine find that it is in a disabled condition beneath the water, if they are able to do so they will release the float and allow it to rise to the surface carrying with it the guide cord 3. The rescuing boat should be provided with the salvage shell. When the float 4 is seen by the rescuing party they will haul the float on board and disconnect it from the guide rope 3, then the upper end of the guide rope will be drawn up through the orifice 11 in the bottom of the shell, thence up through the aperture 10 in the head of the shell and out through the hole 18 in the ring 15 so that the shell may be allowed to slide down on the guide rope which will direct it to the submarine the shell being lowered by the cable 20 to one end of which it is attached, the other end of the chain being made fast to the rescuing vessel. The shell, is of considerable weight and it is attached to the cable 20 in any suitable manner, preferably by means of a clevis 21, which is secured to a sheave 22 around which the cable 20 makes several turns, the other end of said cable 20 making several turns around a sheave 23 which is attached by means of a clevis 24 to a ring on an arm 25 or other suitable support on the rescuing vessel. By means of a suitable winch or other lowering and hoisting apparatus the said cable 20 will be allowed to play out, carrying with it the shell 9 which will slide down the guide rope and as soon as the shell reaches the pear shaped link 6 connected with the submarine, said link being held in the upright position by the pull of the guide cord, said shell will slide down over the link 6, being guided by the flaring slot 11, till the upper end of the said link 6 engages the underside of the said bar 14. The continued downward descent of the shell causes the upper end of the link 6 to push up the free end of the bar 13, turning said bar up on its pivot 14 as shown in Fig. 2 in dotted lines, until the upper end of the said link passes entirely by the said bar 13, and then the combined weight of the bar 13 and the pull of the spring 17 will quickly throw the free end of the bar 13 down again upon its seat, through the opening in the link 6, securely locking said link to the shell and thus making a secure connection between the shell and the submarine to which the link 6 by means of its connected links 5 is attached. If there are two sets of apparatus, as shown in Fig. 1, then in the same manner the other shell will also be connected with the submarine, and when both connections are made, the hoisting apparatus on the rescuing vessel will be set in operation, thus pulling up on the cable 20. The link 6 and the bar 13 must each be strong enough to sustain the weight of the object raised. It will therefore be seen that it is important that the shell and the bar 13 as well as the link 6 and all the parts of the apparatus are very strong.

While I have especially described the apparatus as applied to use in raising a sunken vessel it is obvious that the apparatus may be employed in raising any sunken object which is equipped with that portion of the apparatus which has been described as being attached to the sunken vessel, for instance, a valuable chest or safe might be left on the deck of the vessel where it could be reached by the salvage hook, said chest being equipped with a link or a staple in an upright position and of suitable shape to be engaged by the salvage shell. In the same way any other object that it is anticipated might become sunken could be equipped with a link or staple and if afterward sunk it could be connected with a salvage hook if means are provided whereby a guide cord connected with said object could be floated to the surface.

What I claim is:

1. In a salvage apparatus for sunken vessels, a shell having an interior chamber and formed with a slot extending through the wall of the shell into said chamber, said shell being formed with ledges on each side of said slot and a bar pivoted within said shell on one side of said slot, the other end of said bar bridging across the top of said slot and resting on said other ledge.

2. In a salvage apparatus for sunken vessels, a shell having an interior chamber and formed with a slot extending through the wall of the shell into said chamber, said shell being formed with ledges on each side of said slot, and a bar pivoted within said shell on one side of said slot, the other end of said bar bridging across the top of said slot and normally resting on said other ledge, in combination with a link tapered toward one end, the tapered end being fitted to pass through the slot in said shell and turn the bar on its pivot to permit the end of the link to pass the bar and then permit the bar to pass through the eye of the link and drop back on its seat.

3. In a salvage apparatus for sunken vessels, a shell having an interior chamber and formed with a slot in one end thereof which extends into the interior chamber and is of increasing width transversely in one direction from the interior of the shell toward the outer end and is comparatively narrow in the transverse direction at right angles to said variable width direction of the slot, and a bar pivotally mounted within the shell on one side of said slot, the other end of the bar resting normally on a shoulder on the opposite side of the narrow width of the slot.

4. In a salvage apparatus for sunken vessels, a shell having an interior chamber with a slot in one end thereof which extends into the interior chamber and is of increasing width in one direction from the interior of the shell toward the outer end and is comparatively narrow in the transverse direction at right angles to said variable width direction of the slot, a bar pivotally mounted within the shell on one side of said slot, the other end of the bar resting normally on a shoulder on the opposite side of the slot, the other end of said shell being constructed with means whereby it may be connected with a cable, in combination with a chain adapted to be connected at one end with the sunken vessel and having at the other end a link tapered in a direction away from the vessel to which it is attached, and fitted to pass through the slot in said shell and enter the chamber above said slot and to be engaged by said cross bar in the shell.

5. In a salvage apparatus for sunken vessels, a shell having an interior chamber and an outwardly flaring passage extending from said chamber through one end of the shell, a bar pivoted within said shell on one side of said slot, said bar extending cross wise of the inner end of said slot, a support on which the swinging end of said bar normally rests, and a link which is narrowed toward one end and is fitted to enter said flaring passage and engage said bar to turn it back on its pivot until the said advance end of the link rides past the bar, the eye of the link being shaped to allow the swinging end of the bar to pass through the eye when the bar falls back on its seat.

6. In a salvage apparatus for sunken vessels, a shell having an interior chamber and an outwardly flaring passage extending from said chamber through one end of the shell, a bar pivoted within said shell on one side of said passage, said bar extending cross wise of the inner end of said passage, a support on which the swinging end of said bar normally rests and a link which is narrowed toward one end and is fitted to enter said flaring passage and engage said bar to turn it back on its pivot until the said advance end of the link rides past the bar, the eye of the link being shaped to allow the swinging end of the bar to pass through the eye when the bar falls back on its seat, said shell being formed with an aperture in the head thereof for the passage of a guide cord through the shell, one end of the said cord being attached to the object which is to be salvaged and the other end of the cord extending to the place from which the salvage is to be effected.

7. In a salvage apparatus for sunken vessels, a shell having an interior chamber and an outwardly flaring passage extending from said chamber through one end of the shell, a bar pivoted within said shell on one side of said passage, said bar extending cross wise of the inner end of said passage, a support on which the swinging end of said bar normally rests, a spring which yieldingly holds said bar on its seat and a link which is narrowed toward one end and is fitted to enter said flaring passage and engage said bar to turn it back on its pivot until the said advance end of the link rides past the bar, the eye of the link being shaped to allow the swinging end of the bar to pass through the eye when the bar falls back on its seat.

In testimony whereof I affix my signature, in presence of two witnesses.

BENJAMIN J. HASTINGS.

Witnesses:
   THOMAS C. BACHELDER,
   WILLIAM A. COPELAND.

Copies of this patent may be obtained for five cents each, by addressing the "Commissioner of Patents, Washington, D. C."